United States Patent
Muenz

(10) Patent No.: US 8,499,558 B2
(45) Date of Patent: Aug. 6, 2013

(54) TURBOCHARGER WITH MIXING DEVICE UPSTREAM OF COMPRESSOR INLET

(75) Inventor: Stefan Muenz, Ludwigshafen (DE)

(73) Assignee: BorgWarner Inc., Auburn Hills, MI (US)

( * ) Notice: Subject to any disclaimer, the term of this patent is extended or adjusted under 35 U.S.C. 154(b) by 960 days.

(21) Appl. No.: 12/524,039

(22) PCT Filed: Feb. 1, 2008

(86) PCT No.: PCT/EP2008/000833
§ 371 (c)(1),
(2), (4) Date: Jul. 22, 2009

(87) PCT Pub. No.: WO2008/095658
PCT Pub. Date: Aug. 14, 2008

(65) Prior Publication Data
US 2010/0011765 A1    Jan. 21, 2010

(30) Foreign Application Priority Data
Feb. 5, 2007    (DE) .......................... 10 2007 005 702

(51) Int. Cl.
*F02B 33/44*    (2006.01)

(52) U.S. Cl.
USPC ........................................ 60/605.2; 60/605.1

(58) Field of Classification Search
USPC ................. 60/605.1, 605.2, 598; 123/568.17, 123/568.18, 590; 415/60; 416/175, 198 R, 416/198, 199
See application file for complete search history.

(56) References Cited

U.S. PATENT DOCUMENTS

| | | | | |
|---|---|---|---|---|
| 5,771,868 A * | 6/1998 | Khair | ............................ | 60/605.2 |
| 6,425,382 B1 * | 7/2002 | Marthaler et al. | ........ | 123/568.17 |
| 6,427,671 B1 * | 8/2002 | Holze et al. | .............. | 123/568.17 |
| 6,810,867 B2 * | 11/2004 | Schmid et al. | ............ | 123/568.17 |
| 6,886,544 B1 * | 5/2005 | Bui | ............................ | 123/568.18 |
| 6,988,365 B2 * | 1/2006 | Sasaki | ............................ | 60/605.2 |
| 6,988,868 B2 * | 1/2006 | Ashworth | ........................ | 415/60 |
| 7,243,641 B2 * | 7/2007 | Zukouski | ........................ | 123/568.17 |
| 7,797,937 B2 * | 9/2010 | Endicott et al. | ............... | 60/605.1 |
| 8,056,338 B2 * | 11/2011 | Joergl et al. | ................... | 60/605.2 |
| 2001/0027784 A1 * | 10/2001 | Schmid et al. | ............ | 123/568.17 |
| 2004/0194767 A1 * | 10/2004 | Igarashi et al. | ............... | 123/562 |
| 2005/0172613 A1 * | 8/2005 | Blomquist | ........................ | 60/274 |
| 2006/0075995 A1 * | 4/2006 | Liu et al. | .................. | 123/568.12 |
| 2006/0140767 A1 * | 6/2006 | Garman et al. | ............... | 416/182 |
| 2007/0039597 A1 * | 2/2007 | Zukouski | .................. | 123/568.17 |
| 2007/0144170 A1 * | 6/2007 | Griffith | ............................ | 60/600 |
| 2008/0066466 A1 * | 3/2008 | Melchior | ........................ | 60/605.1 |
| 2009/0071150 A1 * | 3/2009 | Joergl et al. | ................... | 60/605.2 |
| 2009/0223219 A1 * | 9/2009 | Joergl et al. | ................... | 60/605.2 |
| 2011/0011084 A1 * | 1/2011 | Yanagida et al. | ............ | 60/605.2 |

* cited by examiner

*Primary Examiner* — Mary A Davis
(74) *Attorney, Agent, or Firm* — William G. Anderson; Stephen A. Pendorf; Patent Central LLC

(57) ABSTRACT

The present invention relates to a turbocharger (1) for an internal combustion engine (2) comprising at least one exhaust gas recirculation line (3), via which an exhaust gas mixing opening (12) enters into an intake line (10) of the internal combustion engine (2), further comprising a turbine (4) and a compressor (5), which is driveably connected to the turbine (4) and has a compressor impeller (6) that is disposed in a compressor housing (7), into which the intake line (10) empties via a compressor inlet (11), wherein a mixing device (18) is disposed in the intake line (10) between the exhaust gas mixing opening (12) and the compressor inlet (11).

15 Claims, 2 Drawing Sheets

TURBOCHARGER WITH MIXING DEVICE UPSTREAM OF COMPRESSOR INLET

The invention relates to a turbocharger as per the preamble of claim 1.

A generic turbocharger is known from DE 42 13 047.

Turbochargers of said type are used in internal combustions engine that, in order to adhere to legally prescribed exhaust-gas limit values, recirculate large exhaust-gas quantities into the induction path of the engine over a wide operating range. This is carried out in the present prior art by means of so-called high-pressure exhaust-gas recirculation. Low-pressure-side exhaust-gas recirculation has greater potential in relation thereto. Here, the exhaust gas is extracted downstream of the turbine after emerging from the diesel particle filter and is recirculated via a regulating valve, and if appropriate via a cooler, into the fresh-air path upstream of the compressor of the exhaust-gas turbocharger. Here, with regard to the most homogeneous possible inflow into the compressor, it is advantageous for the recirculated exhaust gas to be mixed with the fresh air as completely as possible, but in the case of an injection without further measures, this would lead to very long mixing paths in the induction duct. This increases the installation space required for the inlet path, but such space is often not available in engine bays of modern vehicles.

It is therefore an object of the present invention to create a turbocharger for an internal combustion engine as per the preamble of claim 1 that overcomes the above-stated disadvantages.

Said object is achieved by means of the features of claim 1.

It is thus provided, in the design of the turbocharger according to the invention, that a certain mixing device is installed in the induction line in order to obtain the most complete possible mixture of the recirculated exhaust gas with the fresh air. Said mixing device is arranged in the induction line downstream of the exhaust-gas mixing-in opening and upstream of the compressor inlet as viewed in the flow direction of the fresh air.

The subclaims relate to advantageous refinements of the invention.

Further details, advantages and features of the invention can be gathered from the following description of an exemplary embodiment and the drawing, in which.

Figure 1:
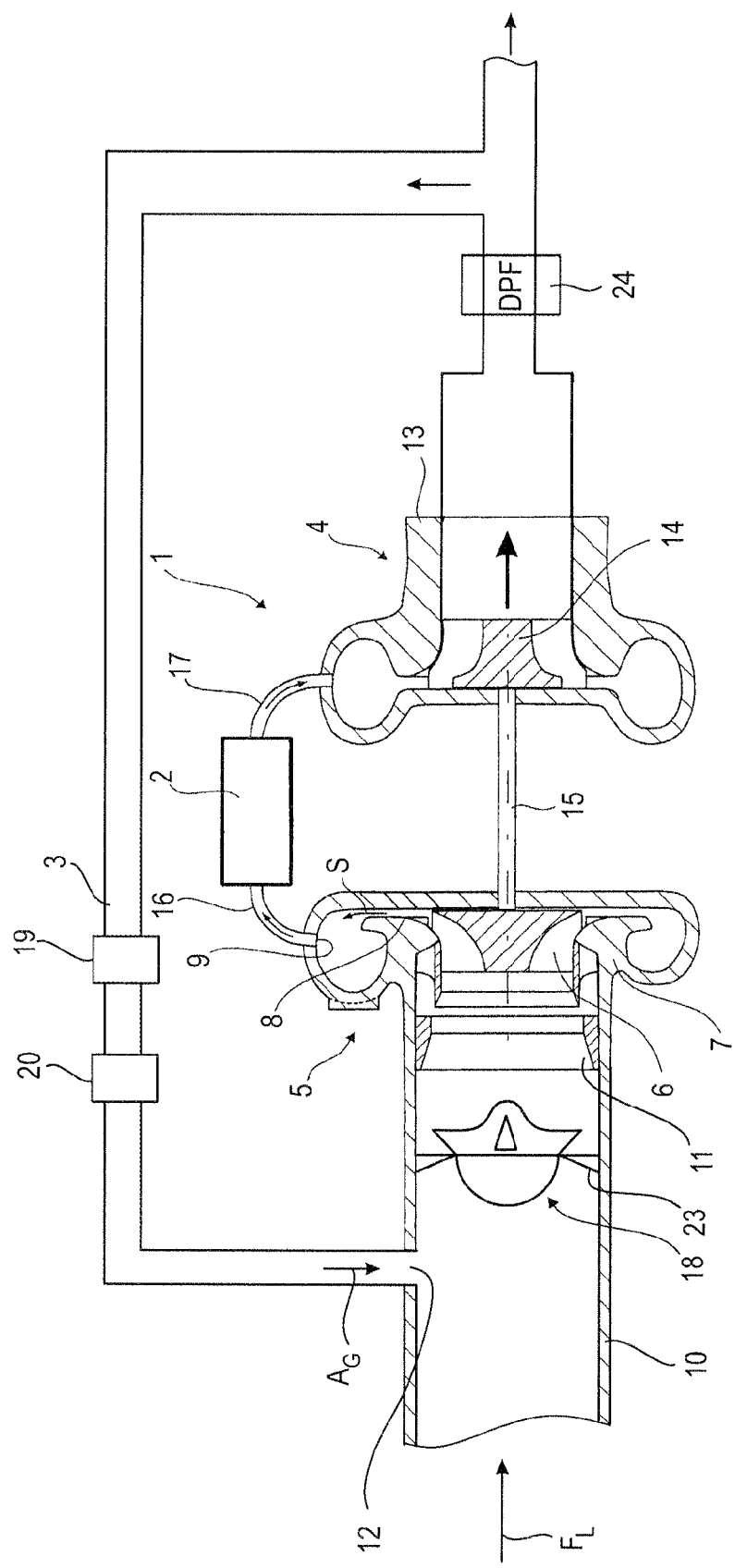
FIG. 1 shows a schematically highly simplified section illustration of a turbocharger according to the invention.

The turbocharger 1 illustrated in FIG. 1 has a turbine 4 with a turbine wheel 14 arranged in a turbine housing 13. Said turbine wheel 14 is connected via a rotor shaft 15 to a compressor wheel 6, that is arranged in a compressor housing 7, of a compressor 5.

An exhaust-gas recirculation line 3 from an engine 2 leads via a regulating valve 19 and a cooler 20 through an exhaust-gas mixing-in opening 12 into an induction line 10 of the engine 2. A mixing device 18, in particular a flower-shaped mixer, is arranged in the induction line 10 upstream of the compressor inlet 11 by means of a mixer bracket 23. The radial component of the flow direction S of the air, that is compressed by the compressor wheel 6, in the diffuser 8 is denoted here by an arrow S.

Also illustrated are a supply line 16 from the compressor outlet 9 to the engine 2 and also an exhaust line 17 from the engine 2 to the turbine housing 13.

By means of said arrangement according to the invention of the exhaust-gas recirculation line 3, the exhaust gas $A_G$ is conducted through the exhaust-gas mixing-in opening 12 into the induction line 10. Here, the exhaust gas $A_G$ impinges on the fresh air $F_L$, and said exhaust gas $A_G$ and fresh air $F_L$ are then mixed together in the flow direction of the fresh air $F_L$ through the mixing device 18, in particular the flower-shaped mixer. After the almost complete mixture of the two material flows, the mixture flows through the compressor inlet 11 into the diffuser 8.

Figure 2:
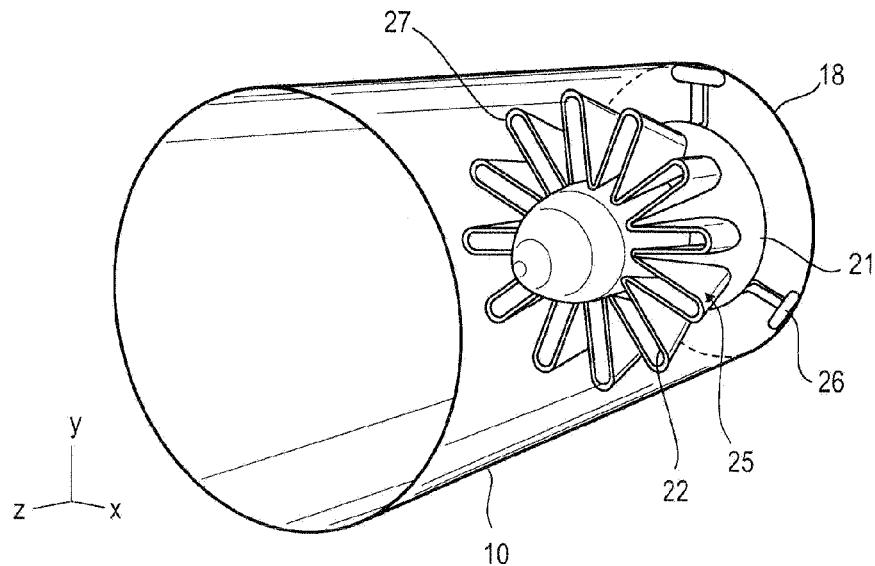
FIG. 2 shows a perspective illustration of a particularly preferred embodiment of a mixing device in the form of a flower-shaped mixer.

FIG. 2 illustrates the mixing device 18, in particular the flower-shaped mixer. The flower-shaped mixer has, in the center, a streamlined core body 25 and also an annular mixer body 21 that surrounds said core body 25 and on which are arranged flow guide plates/mixer plates 22.

The geometry and arrangement of said mixer plates 22 are instrumental in effecting the most complete possible mixture. For this purpose, it is necessary for the core flow that is situated in the center of the line to be conducted radially outward and for the secondary flow that is situated at the outer edge to be conducted radially inward. As a result of the meandering design of the mixer plates, alternating inward and outward radial flow components are generated, as a result of which the boundary layer between said two flows is enlarged and better mixing therefore takes place.

Figure 3:
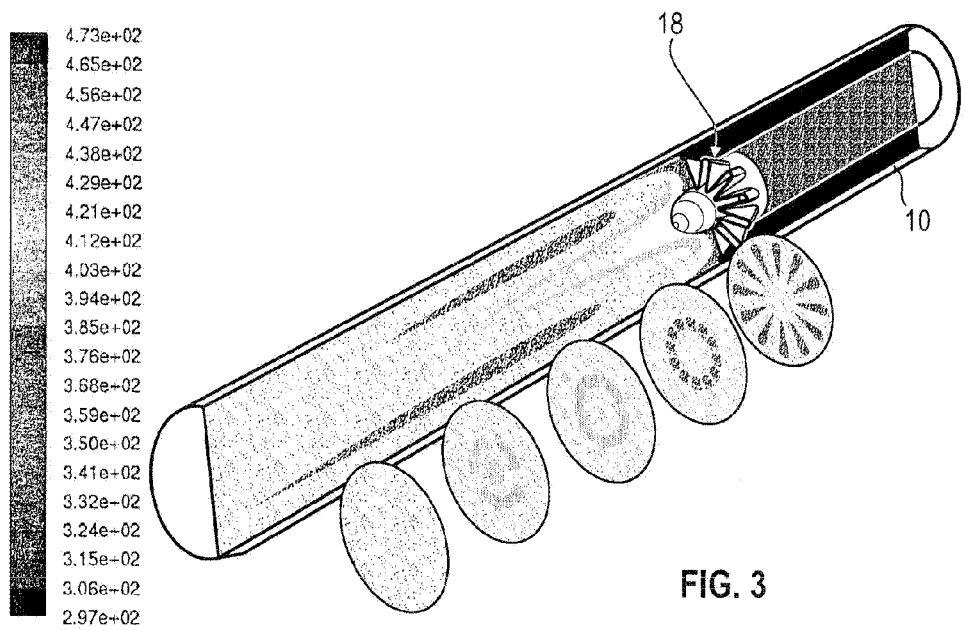
FIG. 3 shows an illustration corresponding to FIG. 2 of the flower-shaped mixer, which illustration shows the numerical simulation of the mixture of two different material flows.

FIG. 3 illustrates the numerical simulation of the mixture of two different material flows by a flower-shaped mixer 18 that is arranged in the induction line 10. It can be seen that two clearly separate gas flows at different temperatures are present upstream of the flower-shaped mixer. The relatively warm recirculated exhaust-gas flow at approximately 473 K is situated in the interior of the line and the relatively cool induction air flow at approximately 297 K is situated at the outer edge. A rapid temperature equalization of the two flows takes place immediately downstream of the mixer, such that mean temperatures in the range from approximately 350 K to 390 K are generated.

To supplement the disclosure, reference is explicitly made to the diagrammatic illustration of the invention in the figure.

LIST OF REFERENCE SYMBOLS

1 Turbocharger/exhaust-gas turbocharger
2 Engine
3 Exhaust-gas recirculation line
4 Turbine
5 Compressor
6 Compressor wheel
7 Compressor housing
8 Diffuser
9 Compressor outlet
10 Induction line
11 Compressor inlet
12 Exhaust-gas mixing-in opening
13 Turbine housing
14 Turbine wheel
15 Rotor shaft
16 Supply line
17 Exhaust line
18 Mixing device, in particular flower-shaped mixer
19 Regulating valve
20 Cooler
21 Annular mixer body
22 Flow guide plates/mixer plates 23 Mixer bracket
24 Diesel particle filter
25 Central flow body
26 Fixing webs
27 Outer region of the guide plates
$A_G$ Exhaust gas
$F_L$ Fresh air
S Flow direction of the compressed air

The invention claimed is:

1. A turbocharger (1) for an internal combustion engine (2) including:
    at least one exhaust-gas recirculation line (3) that enters via an exhaust-gas mixing-in opening (12) into an induction line (10) of the internal combustion engine (2);
    a turbine (4);
    a compressor (5) that is drive-connected to the turbine (4) and has a compressor wheel (6) that is arranged in a compressor housing (7) into which the induction line (10) enters via a compressor inlet (11); and
    a mixing device (18) arranged in the induction line (10) downstream of the exhaust-gas mixing-in opening (12) and upstream of the compressor inlet (11) in the direction of flow (FL) in the induction line (10), the mixing device (18) having meandering guide plates for conducting an outer, secondary flow radially inward.

2. The turbocharger as claimed in claim 1, wherein the mixing device (18) has a central flow body (25) for accelerating an inner core flow.

3. The turbocharger as claimed in claim 2, wherein the mixing device (18) conducts the inner core flow radially outward.

4. The turbocharger as claimed in claim 1, wherein the mixing device (18) conducts a core flow outward and conducts the secondary flow inward.

5. The turbocharger as claimed in claim 1, wherein the mixing device (18) is fixed to an annular mixer body (21) in the induction line (10) by an outer region (27) of guide plates and/or by webs (26).

6. The turbocharger as claimed in claim 1, wherein the mixing device (18) is a flower-shaped mixer.

7. A turbocharger (1) for an internal combustion engine (2) including:
    at least one exhaust-gas recirculation line (3) that enters via an exhaust-gas mixing-in opening (12) into an induction line (10) of the internal combustion engine (2);
    a turbine (4);
    a compressor (5) that is drive-connected to the turbine (4) and has a compressor wheel (6) that is arranged in a compressor housing (7) into which the induction line (10) enters via a compressor inlet (11); and
    a mixing device (18) arranged in the induction line (10) downstream of the exhaust-gas mixing-in opening (12) and upstream of the compressor inlet (11) in the direction of flow (FL) in the induction line (10), the mixing device (18) being fixed to an annular mixer body (21) in the induction line (10) by an outer region (27) of guide plates and/or by webs (26).

8. The turbocharger as claimed in claim 7, wherein the mixing device (18) has a central flow body (25) for accelerating an inner core flow.

9. The turbocharger as claimed in claim 8, wherein the mixing device (18) conducts the inner core flow radially outward.

10. The turbocharger as claimed in claim 7, wherein the mixing device (18) conducts an outer, secondary flow radially inward.

11. The turbocharger as claimed in claim 7, wherein the mixing device (18) conducts an inner core flow outward and conducts an outer secondary flow inward.

12. The turbocharger as claimed in claim 7, wherein the mixing device (18) is a flower-shaped mixer.

13. A turbocharger (1) for an internal combustion engine (2) comprising:
    at least one exhaust-gas recirculation line (3) that enters via an exhaust-gas mixing-in opening (12) into an induction line (10) of the internal combustion engine (2);
    a turbine (4);
    a compressor (5) that is drive-connected to the turbine (4) and has a compressor wheel (6) that is arranged in a compressor housing (7) into which the induction line (10) enters via a compressor inlet (11); and
    a mixing device (18) arranged in the induction line (10) downstream of the exhaust-gas mixing-in opening (12) and upstream of the compressor inlet (11) in the direction of flow (FL) in the induction line (10), the mixing device (18) being configured to conduct an inner core flow radially outward and conduct an outer secondary flow radially inward.

14. The turbocharger as claimed in claim 13, wherein the mixing device (18) is configured to conduct the inner core flow radially outward and conduct the outer secondary flow radially inward in an alternating pattern.

15. The turbocharger as claimed in claim 13, wherein the mixing device (18) is configured to conduct the outer secondary flow radially inward by meandering guide plates.

* * * * *